L. ROUANET.
PULLEY CONSTRUCTION.
APPLICATION FILED AUG. 4, 1917.
1,373,675.
Patented Apr. 5, 1921.
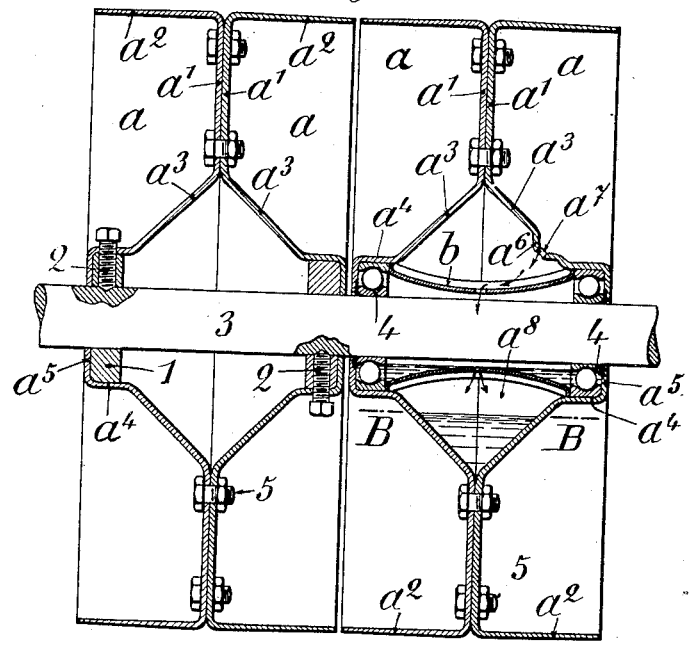
Fig. 1.
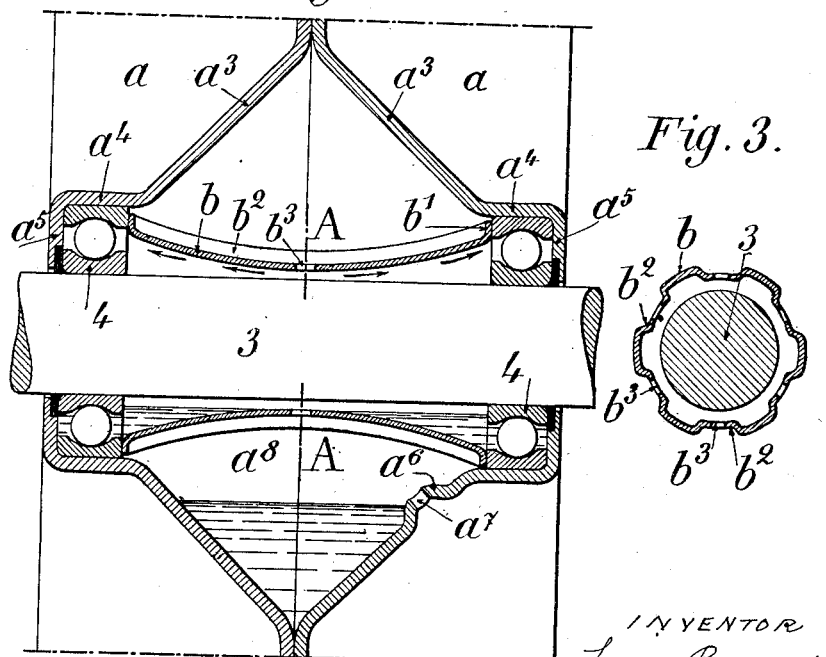
Fig. 2.
Fig. 3.
INVENTOR
Louis Rouanet

UNITED STATES PATENT OFFICE.

LOUIS ROUANET, OF IVRY-PORT, FRANCE, ASSIGNOR TO CAMPAGNIE D'APPLICATIONS MECANIQUES, OF IVRY-PORT, FRANCE.

PULLEY CONSTRUCTION.

1,373,675.

Specification of Letters Patent.

Patented Apr. 5, 1921.

Application filed August 4, 1917. Serial No. 184,495.

*To all whom it may concern:*

Be it known that I, LOUIS ROUANET, citizen of the Republic of France, residing at 42 Rue Franklin, Ivry-Port, Seine, in the Republic of France, have invented new and useful Improvements in Pulley Constructions, of which the following is a specification.

The present invention relates to improvements in the construction of pulleys, which pulleys are obtained by a simple stamping process out of sheet metal and without any machine work, each fixed or loose pulleys being composed essentially of two disks having a special shape and of identical construction which are assembled back to back and closely connected by a suitable fixing method.

The invention consists in the production of such disks, and these are designed in such shape that in the case of a loose pulley mounted upon ball-bearings and combined with a connecting piece preferably of thin metal and having a certain amount of elasticity, said pulley containing a certain amount of lubricating substance placed inside a specially designed chamber formed by the assemblage of the two disks; in such case a constant and regular lubrication is assured by the action of centrifugal force during the rotation of the pulley by which said lubricating substance is caused to mount within said connecting piece so as to enter the ball-bearings.

On the other hand, the invention consitsts of a new device employed for introducing the lubricating substance; to this effect a simple cavity provided with a hole is disposed upon one of the disks of the loose pulley, this cavity being made at a selected point on said disk so as to permit of introducing a considerable amount of lubricating substance (such amount being determined by the position of the hole in the cavity) and the special shape of said cavity prevents the lubricating substance from being thrown outside the pulley, especially during the rotation of the latter.

In the class of industrial products, the invention relates to the above construction for pulleys, and more especially to loose pulleys obtained by the stamping process and mounted upon ball-bearings, it being recognized that loose pulleys have been already constructed by the stamping process, and even mounted upon ball-bearings and carrying between the ball-bearings a chamber which is filled with lubricating substance through an opening which is thereupon stopped by the use of a suitable device, but previous inventors did not have the idea of taking special pains to give a suitable shape to the two disks, nor did they combine with them a special part disposed between the two ball-bearings, so that such pulleys make use of centrifugal force in combination with said special part in order to obtain a constant and regular lubrication of the set of ball-bearings, and this even in proportion to the speed of rotation.

The invention will be better understood by referring to the accompanying drawing.

Figure 1 is a sectional view representing a fixed and a loose pulley mounted upon the same shaft.

Fig. 2 is a partial section on a larger scale showing the loose pulley seen in Fig. 1 (the cavity being at the bottom in this case).

Fig. 3 is a section along the line A—A of Fig. 2.

Each of the halves $a$ which forms a fixed or loose pulley is obtained by the stamping process by the use of the same tools, and has the shape of a disk $a^1$ carrying a flange at its periphery in order to produce one half of the rim of the pulley $a^2$. Near the central part this disk takes the form of $a^3$ extending outward to the cylindrical portion $a^4$ forming the hub and this latter is then overturned at $a^5$ in order to receive a ring 1 (in the case of a fixed pulley) containing a threaded hole adapted to receive the set screw 2 for fixing the pulley upon the shaft 3. In the case of a loose pulley, the ring 1 is replaced by a ball-bearing 4 adapted inside the hub $a^4$, and in this latter case the hub is machined to a slight degree for the aforesaid purpose.

To obtain a fixed pulley, each disk constructed as above mentioned is mounted back to back with a second and similar disk, and these two parts are held together by bolts or even by the rivets 5. To obtain a loose pulley, before fixing together the two halves $a$, there is placed between the two ball-bearings 4 a coupling piece $b$ in thin metal which has a certain amount of elasticity, which piece forms a coupler and also affords a joint at its flanges $b^1$, thus holding the ball-bearings in position when the two halves of the pulley are assembled. This coupling piece has flaring ends and is provided on its periphery with a number of grooves $b^2$ each of which contains a small hole $b^3$ at its middle part, i. e. at the portion having the smallest diameter.

Lubrication of a loose pulley of this construction is carried out as follows: The cavity $a^6$ is formed in the conical part $a^3$ of one of the pulley halves $a$ and contains a hole $a^7$ whose diameter is just sufficient for inserting the end of an oil feeder used to fill up the pulley with a certain amount of lubricating substance to the level B—B, this level should never exceed that of the hole $a^7$ when the latter is at the lower part (Fig. 2). The lubricating substance poured in through the hole $a^7$ falls upon the coupling piece $b$ and proceeds thence through the grooves $b^2$ to the holes $b^3$ whence it flows into the inside of said coupling piece. This latter fills up until the level of the lubricating substance exceeds that of the holes $b^3$ situated at the lower part of the coupling piece (Fig. 1) and when this occurs the lubricating substance flows into the lubricating chamber formed within the pulley, and the latter can then be filled up to the above-mentioned level B—B.

When the pulley rotates, the centrifugal force acts on the one hand to keep the lubricating material in the chamber at the apex of the cone, while on the other hand the lubricating material in the coupling piece is forced to rise to the ball-bearings along the inner side of said coupling piece (Fig. 2). When the pulley is stopped, a certain amount of lubricating material from the chamber $a^8$ flows along the grooves $b^2$ of the coupling piece $b$ so as to automatically replace the material consumed in the coupling piece $b$, entering for this purpose through the holes $b^3$ into the inside of the coupling piece.

It is understood that the form of coupling piece represented in the drawing is intended only as an example of the present invention and that any other form can be adopted which will fulfil the same purpose.

Having now described my invention, what I claim as new and desire to secure by Letters Patent is:

1. A loose pulley containing in combination, two stamped disks each having a cylindrical peripheral portion, a plane annular portion perpendicular to the preceding, a truncated cone portion, a central cylindrical portion and a central plane portion perpendicular to the preceding, means for connecting the two disks, two ball-bearings mounted around the pulley shaft and within the central cylindrical portions of the two stamped disks, a coupling piece surrounding the pulley shaft and disposed between the two ball-bearings, which piece possesses flanges at its ends and also a set of grooves upon its surface each groove being provided with a hole in its middle part, and means for introducing a lubricating substance into the space comprised between the two disks, substantially as described and for the purpose set forth.

2. A loose pulley containing, in combination, two stamped disks each having a cylindrical peripheral portion a plane annular portion perpendicular to the preceding, a truncated cone portion, a central cylindrical portion and a central annular plane portion perpendicular to the preceding, the truncated portion of one disk being provided near the center of the disk with a cavity containing a hole; bolts for connecting the two disks, two ball-bearings mounted around the pulley shaft and within the central cylindrical parts of the two stamped disks, and a coupling piece surrounding the pulley shaft and disposed between the two ball-bearings, which piece has flanges at its ends and also a set of grooves upon its surface each groove being provided with a hole in its middle part, substantially as described and for the purpose set forth.

3. In combination, a pulley, bearings within the pulley and a coupling piece between the bearings for the purpose described, said coupling piece being formed at regularly spaced intervals with grooves and openings in the walls of the grooves.

4. In combination, a shaft, a pulley surrounding the shaft, bearings between the shaft and pulley, and a coupling piece encircling the shaft between said bearings and having a convex wall adjacent to said shaft.

5. A pulley comprising a pair of disks secured together at their intermediate portions and bent in opposite directions inwardly from the intermediate portions to provide a truncated conical portion, then bent to provide bearing receiving cylindrical portions, said conical portion being formed with openings to admit a lubricant and means within the conical portion for confining a lubricant in the cylindrical portions.

6. In combination, a pulley, spaced bearings carried by the pulley, a lubricating chamber between the bearings having a circumferentially extending groove therein, a coupling piece between the bearings and within the chamber arranged to receive the lubricant from the chamber and to distribute the same to the bearings when the pulley is rotating.

7. In combination a pulley, spaced bearings carried by the pulley, a lubricating chamber between the bearings, and a coupling piece between the bearings and within the chamber, said coupling piece being in the form of a parabolic spindle and having openings therein to effect a communication between the chamber and the interior thereof.

8. In combination a pulley, spaced bearings carried by the pulley, a lubricating chamber between the bearings, a coupling piece within the chamber arranged to supply the bearings with the lubricant contained in said chamber, and means formed on the coupling piece for causing the lubricant in said chamber to automatically replace the lubricant consumed in the interior of the coupling piece.

9. A pulley comprising in combination two stamped disks having flat annular portions in contact with each other, integral annular flanges formed on the periphery of said portions and extending outwardly therefrom, inner truncated cone portions, central cylindrical portions and central plane portions perpendicular to the preceding, means for securing the two disks to each other, two ball bearings inside the central cylindrical portions and in contact with the central plane portions and means for lubricating said ball bearings.

In testimony whereof I have signed my name to this specification in the presence of two subscribing witnesses.

LOUIS ROUANET.

Witnesses:
 Louis Mosès,
 Chas. P. Pressly.